Oct. 20, 1925.  1,557,807
F. L. CUMMINGS
IMPLEMENT FOR RETURNING THE TEMPERATURE INDICATING SUBSTANCE OF
THERMOMETERS TO NORMAL
Filed Jan. 6, 1925
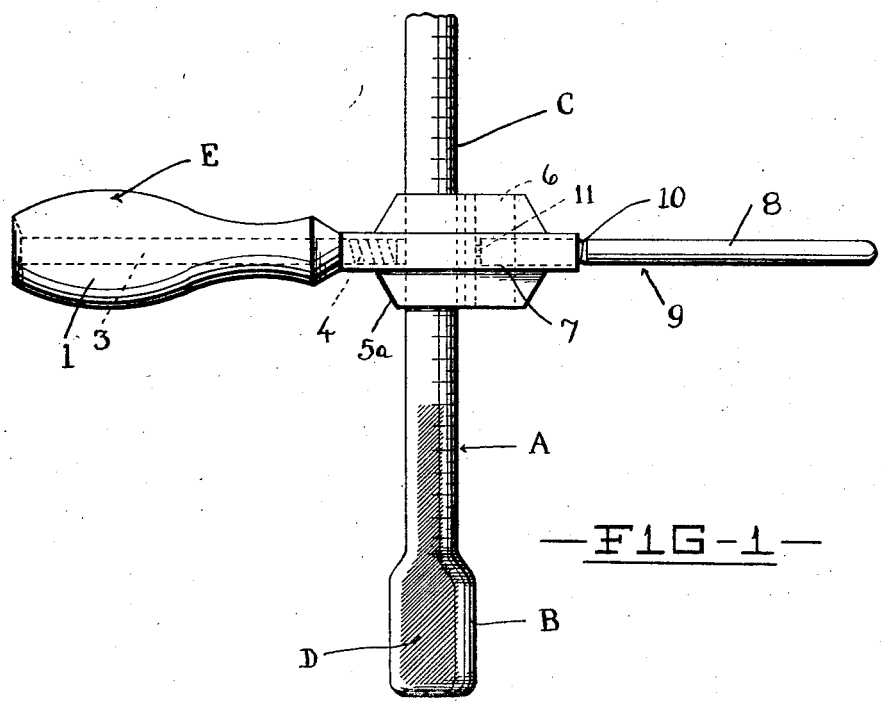
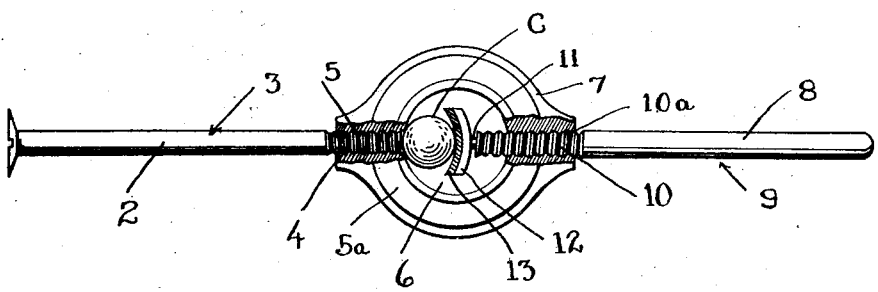
Inventor
F. L. CUMMINGS,
By
Attorney Patented Oct. 20, 1925.

1,557,807

UNITED STATES PATENT OFFICE.

FLORENCE L. CUMMINGS, OF ASHEVILLE, NORTH CAROLINA.

IMPLEMENT FOR RETURNING THE TEMPERATURE-INDICATING SUBSTANCE OF THERMOMETERS TO NORMAL.

Application filed January 6, 1925. Serial No. 819.

*To all whom it may concern:*

Be it known that I, FLORENCE L. CUMMINGS, a citizen of the United States, residing at Asheville, in the county of Buncombe and State of North Carolina, have invented new and useful Improvements in Implements for Returning the Temperature-Indicating Substance of Thermometers to Normal, of which the following is a specification.

My invention, in its broad aspect, has reference to improvements in implements for returning the mercury or other temperature indicating substance of clinical thermometers to a normal level after a temperature has been taken; and more particularly it is my purpose to eliminate the necessity of shaking clinical thermometers by affecting the return of the temperature indicating substance through the utilization of centrifugal force induced by rapid rotation of a thermometer in my unique implement.

In order to properly treat certain diseases, such for instance as tuberculosis, it is necessary to take the temperature of the patient a number of times each day. In the treatment of tubercolosis, for instance, these various temperature readings are taken by the patient, and it has been found that the violent exertions necessary to the shaking of a clinical thermometer operates to the detriment of the patient's physical condition. Indeed instances are known where the exertion of shaking a thermometer have caused hemorrhage and collapse of the lung. A much simpler manner of returning the indicating substance, such as mercury, of a clinical thermometer has been conceived by me, which involves no exertion on the part of the patient in that a thermometer is merely clamped in my improved implement and the implement rotated between the fingers of the patient until the induced centrifugal force returns the mercury, or other indicating substance, to normal.

Other and equally important objects of my invention may be briefly defined as follows: first, I have provided means whereby my implement is perfectly balanced in the hands of a user whereby to facilitate its manipulation; second, means are provided in the form of an adjustable, padded clamping member for holding a thermometer of any conventional size in my implement; third, the parts of my implement are simple and readily disassembled for cleaning and the like, and, fourth, I have reduced the number of parts of my implement to a minimum and so formed such parts that the assembly may be manufactured and placed on the mraket at a nominal price.

The structural elements and other means employed to accomplish the above and other equally important objects and advantages will be hereinafter more fully described in detail and specifically pointed out in the claims appended hereunto and forming a part of this specification, but the scope of my invention may only be determined by the limits defined in the claims.

In the accompanying drawing wherein is illustrated the preferred embodiment of my invention;—

Figure 1 is a greatly enlarged view of my implement showing a clinical thermometer retained therein, and Figure 2 is a top plan view of my implement partly in section and with the handle removed showing to advantage the clamping means for holding a thermometer.

In the drawing like characters of reference designate like or similar parts throughout the several views, in which;—

A designates conventionally a clinical thermometer, B the bulb thereof, C the body, and D the temperature indicating substance, such for instance as mercury or the like. E designates generally my implement within which the thermometer A is held in the manner which will hereinafter appear.

My implement is formed with a handle (1) which is rotatably mounted on the shank (2) of a pin (3). The pin (3) has a screwthreaded end (4) which engages in a tap (5) in the body (5ª) to hold the handle in place thereon. The body (5ª) is formed with a central opening (6) and a ribbed side member (7), and adjustably mounted on the body diametrically opposite to the handle (1) is the shank (8) of a clamping member (9). The clamping member (9) has a screwthreaded end (10) which engages within a screwthreaded tap (10ª) of the body. On the screwthreaded end of the member (9) is formed a pin (11) upon which an arcuately curved jaw (12) is carried rotatably in any suitable manner. Manifestly by feeding the member (9) into the body the jaw may be made to engage or release a clinical thermometer disposed in the opening (6) of the body (5ª), and in order to cushion the contact of the jaw with the thermometer I provide a resilient buffer pad (13). The shank (8) of the clamping member (9) serves as a finger grip; it being designed to support the implement by grasping the handle and the shank of the clamping member.

In operation, the body C of a clinical thermometer A is placed in the opening (6) of the body (5ª), whereupon the clamping member (9) is rotated to feed the jaw (12) into clamping relationship with the body C, thus to hold the thermometer securely in position. The handle E is now grasped and the body (5ª) rapidly rotated by twisting the shank (8) of the member (9). The centrifugal force thus generated or induced will manifestly cause the temperature indicating substance D of the thermometer to return to its normal position. Attention is again invited to the fact that the desired result is obtained without shaking the thermometer or indulging in any physical exertion other than that of rotating the shank (8) of the member (9), and it may be here mentioned that a better result is obtained for the reason that the body temperature of the patient is not communicated to the thermometer during the process of shaking as the fingers of the patient do not come into direct contact with it.

While in the foregoing, there has been illustrated and described such combination and arrangement of elements as constitute the preferred embodiments of my invention, it is nevertheless desired to emphasize the fact that interpretation of the invention should only be conclusive when made in the light of the subjoined claims.

I claim:—

1. An implement of the type described comprising a body formed with an opening for receiving a thermometer, a plurality of members carried by the body and extending outwardly therefrom to form hand grips, one of said members carrying a jaw for releasably engaging a thermometer and being adjustably mounted on the body for the purpose defined.

2. An implement of the type described comprising a body formed with a central opening for receiving a thermometer, a plurality of members carried by the body and extending outwardly therefrom, an adjustable jaw carried within the opening and supported by one of said members, and a buffer carried by the jaw for the purpose defined.

3. An implement of the type described comprising a non-adjustable body formed with an opening for receiving therethrough a thermometer, arms extending from the body, one of said arms being adjustable, and a jaw carried by said adjustable arm for engagement with the thermometer for holding the same in position in the body.

4. An implement of the type described comprising a non-adjustable body formed with a central opening of fixed diameter and adapted to receive therein a thermometer, radial arms extending from the body, one of said arms being adjustable to feed into and out of the body, a jaw carried by the arm for engagement with the thermometer for holding same in position in the body, and a yieldable facing member carried by the jaw for the purpose defined.

In testimony whereof, I affix my signature hereunto.

FLORENCE L. CUMMINGS.